(12) United States Patent
Yoshimatsu et al.

(10) Patent No.: US 12,214,542 B2
(45) Date of Patent: Feb. 4, 2025

(54) LINK DEVICE AND STRETCHING MACHINE

(71) Applicant: THE JAPAN STEEL WORKS, LTD., Tokyo (JP)

(72) Inventors: Naoaki Yoshimatsu, Tokyo (JP); Ichiro Nakajima, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 398 days.

(21) Appl. No.: 17/866,457

(22) Filed: Jul. 15, 2022

(65) Prior Publication Data
US 2023/0016645 A1 Jan. 19, 2023

(30) Foreign Application Priority Data
Jul. 16, 2021 (JP) .................................. 2021-117833

(51) Int. Cl.
*B29C 55/16* (2006.01)
*B29C 55/20* (2006.01)

(52) U.S. Cl.
CPC ............ *B29C 55/165* (2013.01); *B29C 55/20* (2013.01)

(58) Field of Classification Search
CPC ........... C08J 5/18; B29C 55/165; B29C 55/20
See application file for complete search history.

(56) References Cited

U.S. PATENT DOCUMENTS

| | | | | | |
|---|---|---|---|---|---|
| 3,153,812 | A | * | 10/1964 | Seilchi ................. | B29C 55/165 26/73 |
| 3,195,177 | A | * | 7/1965 | Mitsuaki ............... | B29C 55/165 26/73 |
| 3,276,071 | A | * | 10/1966 | Kazunori .............. | B29C 55/165 26/73 |
| 3,457,608 | A | * | 7/1969 | Gageur ................. | D06C 3/023 26/93 |
| 3,469,291 | A | * | 9/1969 | Gageur ................. | D06C 3/025 26/93 |
| 3,580,451 | A | * | 5/1971 | Fraitzl .................. | B65G 17/323 26/93 |
| 3,638,289 | A | * | 2/1972 | Dornier ................ | B29C 55/165 26/93 |
| 4,134,189 | A | * | 1/1979 | Richter ................. | D06C 3/10 26/96 |

(Continued)

FOREIGN PATENT DOCUMENTS

JP 4379306 B2 12/2009

*Primary Examiner* — Jeffrey M Wollschlager
(74) *Attorney, Agent, or Firm* — Potomac Law Group, PLLC

(57) ABSTRACT

Link devices include a plurality of link mechanisms which are coupled so as to form an endless chain and can move along two rails. Each of the link mechanisms includes first and second rail holders, a plurality of guide rollers provided on the first rail holder and moving along one rail while rotating, and a plurality of guide rollers provided on the second rail holder and moving along the other rail while rotating. The plurality of link mechanisms include three-roller link mechanisms in each of which three guide rollers are provided on the first rail holder and two-roller link mechanisms in each of which two guide rollers are provided on the first rail holder, and the three-roller link mechanisms and the two-roller link mechanisms are arranged alternately.

11 Claims, 12 Drawing Sheets

(56) References Cited

U.S. PATENT DOCUMENTS

| | | | | |
|---|---|---|---|---|
| 4,614,011 A | * | 9/1986 | Nicholas | D06C 3/025 26/93 |
| 4,652,409 A | * | 3/1987 | Leese | B29C 55/165 264/448 |
| 4,674,159 A | * | 6/1987 | Sclater | B29C 55/20 26/93 |
| 4,736,498 A | * | 4/1988 | Langer | D06C 3/04 26/93 |
| 4,879,788 A | * | 11/1989 | Suzuki | B29C 55/20 26/94 |
| 5,081,750 A | * | 1/1992 | Molz | D06C 3/04 26/93 |
| 5,101,965 A | * | 4/1992 | Rutz | D06C 3/023 226/173 |
| 5,613,284 A | * | 3/1997 | Hosmer | D06C 3/025 26/93 |
| 5,768,755 A | * | 6/1998 | Hemmerich | B29C 55/20 26/93 |
| 5,924,180 A | * | 7/1999 | Lindner | B29C 55/165 26/72 |
| 5,933,930 A | * | 8/1999 | Rutz | B29C 55/165 26/93 |
| 8,286,313 B2 | * | 10/2012 | Sano | B29C 55/20 26/93 |
| 9,073,257 B2 | * | 7/2015 | Sano | B29C 55/08 |
| 2007/0267278 A1 | * | 11/2007 | Reist | F16C 29/0614 198/852 |
| 2016/0185032 A1 | * | 6/2016 | Eckart | B29C 55/20 425/403.1 |
| 2016/0207229 A1 | * | 7/2016 | Ikeuchi | B65H 23/022 |
| 2016/0238076 A1 | * | 8/2016 | Aiga | C10M 125/22 |
| 2018/0071973 A1 | * | 3/2018 | Ikeda | B29C 55/165 |
| 2019/0039282 A1 | * | 2/2019 | Unterreiner | B29C 55/20 |
| 2020/0132118 A1 | * | 4/2020 | Swoboda | F16C 33/16 |
| 2021/0108347 A1 | * | 4/2021 | Bauer | B29C 55/20 |

* cited by examiner

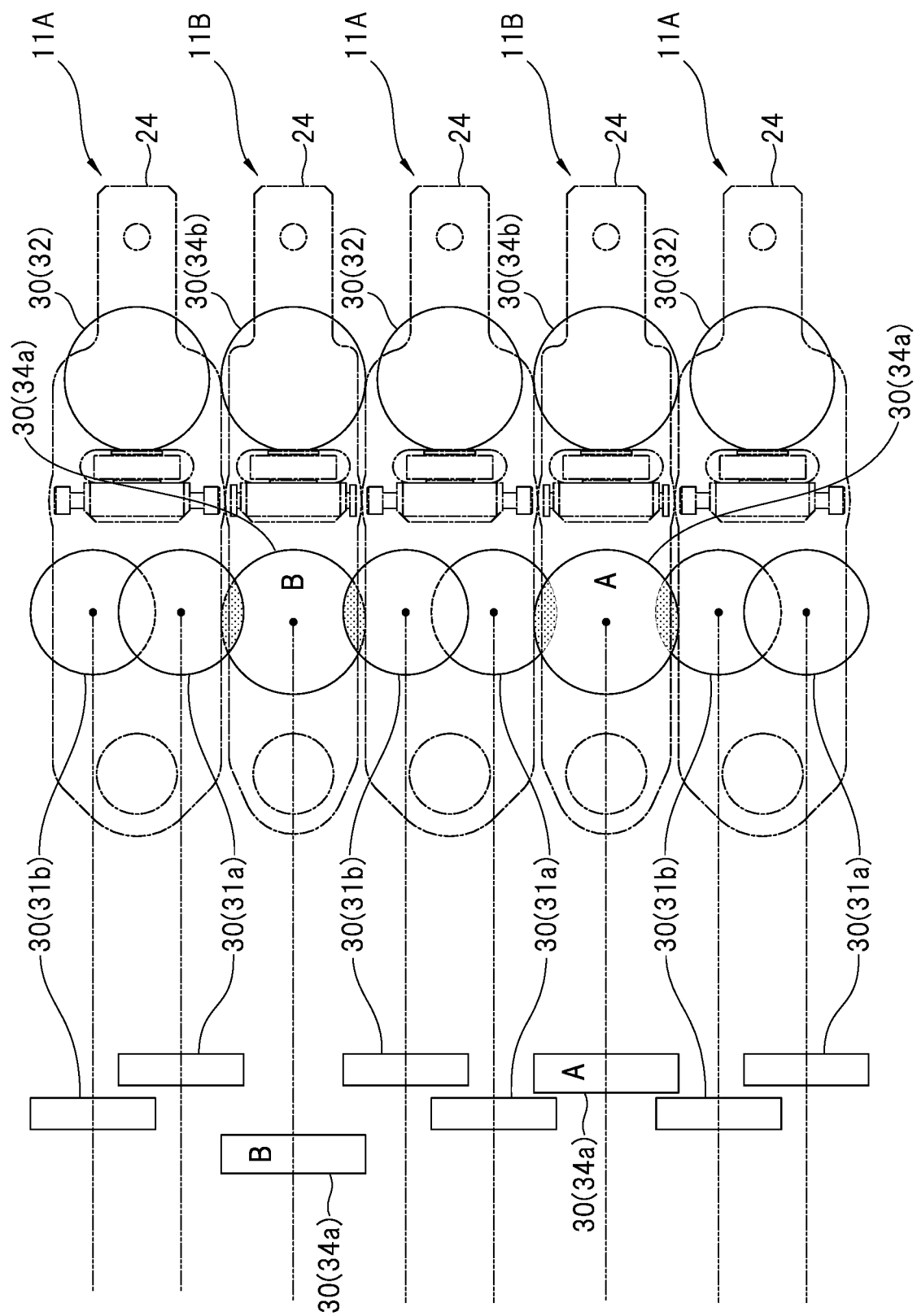

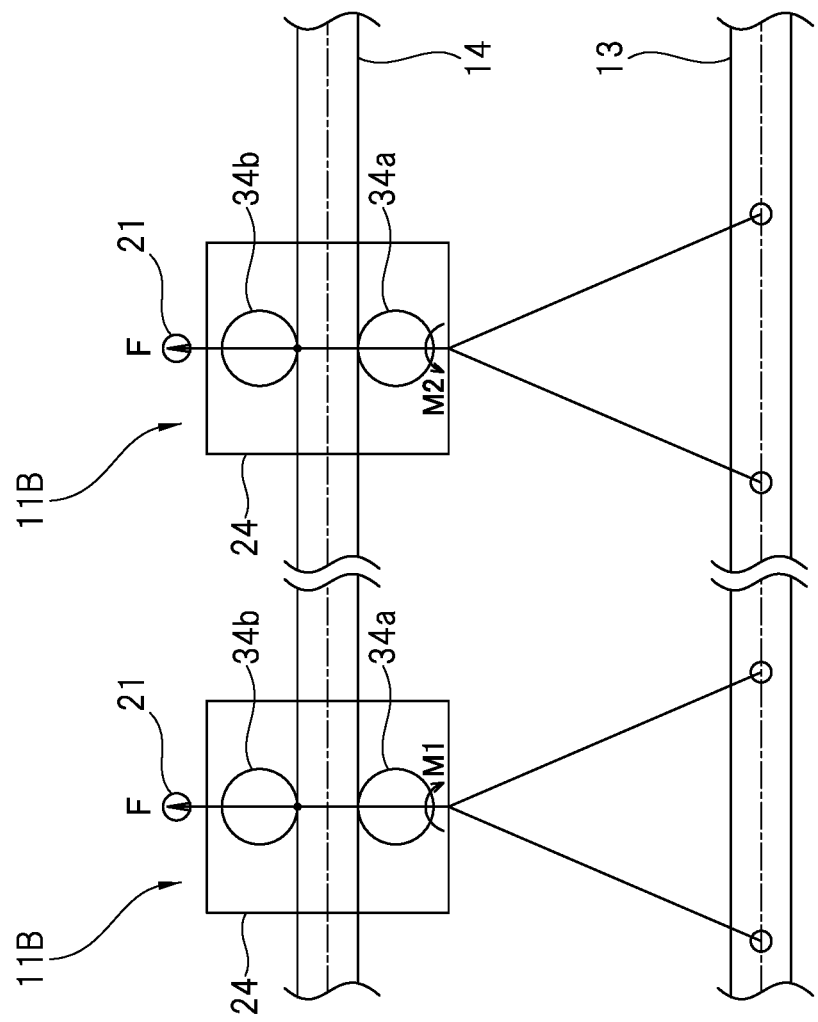

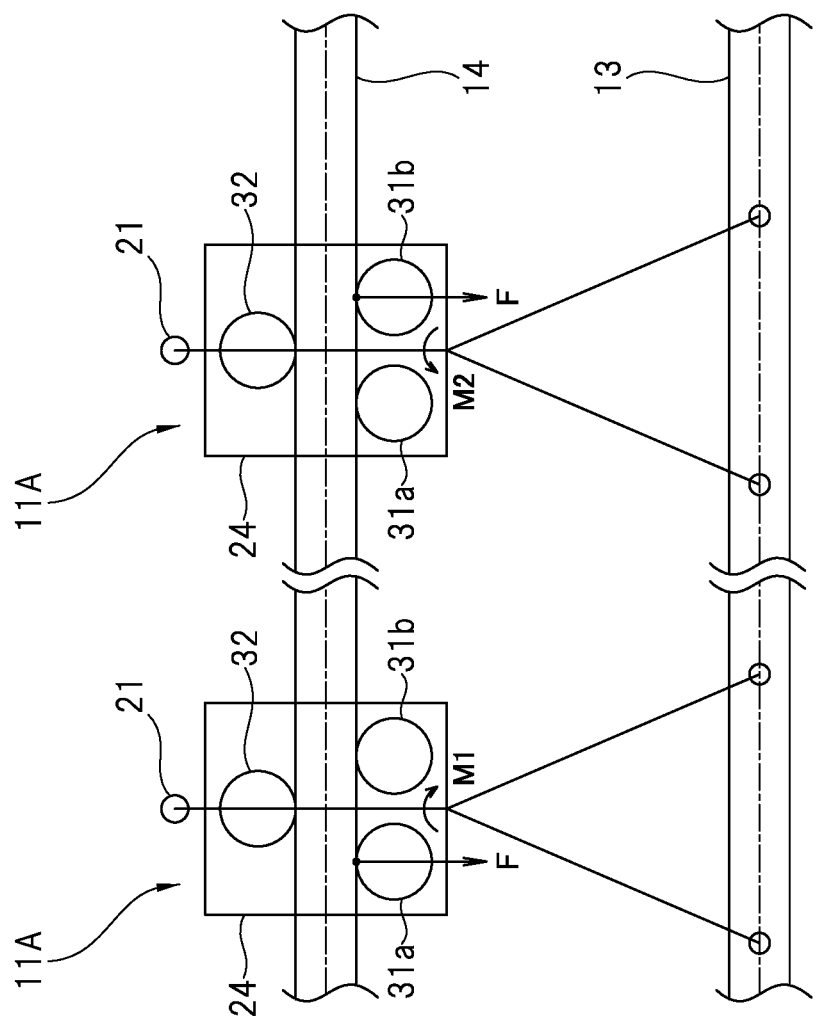

_(54)_ LINK DEVICE AND STRETCHING MACHINE

CROSS-REFERENCE TO RELATED APPLICATION

The present application claims priority from Japanese Patent Application No. 2021-117833 filed on Jul. 16, 2021, the contents of which are hereby incorporated by reference into this application.

TECHNICAL FIELD OF THE INVENTION

The present invention relates to a link device and a stretching machine.

BACKGROUND OF THE INVENTION

A stretching machine configured to stretch a sheet, a film, or the like in a longitudinal direction and a transverse direction while conveying it has been known. For example, Japanese Patent No. 4379306 (Patent Document 1) discloses a simultaneous biaxial stretching machine in which longitudinal stretching and transverse stretching of a sheet-like object are performed simultaneously. The simultaneous biaxial stretching machine disclosed in Patent Document 1 includes a link device, and the link device includes a plurality of equal-length link units (link mechanisms) coupled like a folding scale.

In the simultaneous biaxial stretching machine disclosed in Patent Document 1, a sheet-like object is stretched by changing intervals between the plurality of equal-length link units (link mechanisms) that are gripping the sheet-like object.

SUMMARY OF THE INVENTION

In order to improve the properties of the stretched film, it is desired to narrow the intervals for gripping the film (chucking width).

Other objects and novel features will be apparent from the description of this specification and the accompanying drawings.

A link device according to one embodiment includes a plurality of link mechanisms which can move along two rails. Each of the link mechanisms includes a first rail holder and a second rail holder, a plurality of guide rollers provided on the first rail holder and moving along one of the two rails while rotating, and a plurality of guide rollers provided on the second rail holder and moving along the other of the two rails while rotating. The plurality of link mechanisms include three-roller link mechanisms in each of which three guide rollers are provided on the first rail holder and two-roller link mechanisms in each of which two guide rollers are provided on the first rail holder, and the three-roller link mechanisms and the two-roller link mechanisms are arranged alternately.

According to one embodiment, it is possible to manufacture sheets, films, and the like having good properties.

BRIEF DESCRIPTIONS OF THE DRAWINGS

FIG. 10 is an explanatory diagram showing a positional relationship of guide rollers when the plurality of link mechanisms are closed to the minimum pitch;

FIG. 11 is an explanatory diagram of a moment acting on a chucking portion of the two-roller link mechanism; and FIG. 12 is an explanatory diagram of a moment acting on a chucking portion of the three-roller link mechanism.

DESCRIPTIONS OF THE PREFERRED EMBODIMENTS

Figure 1:
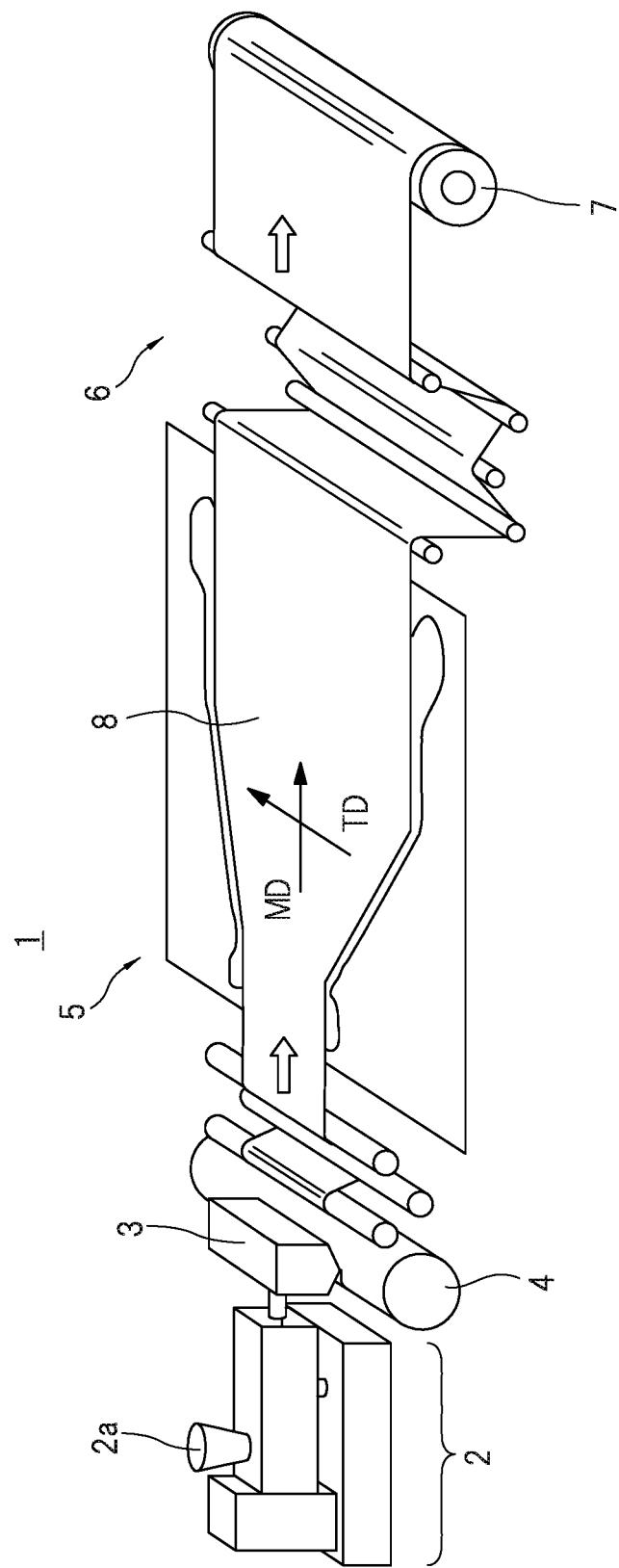
FIG. 1 is a schematic diagram showing a thin-film manufacturing system.

Hereinafter, an embodiment will be described in detail with reference to drawings. Note that the members having the same or substantially same function are denoted by the same reference characters throughout the drawings for describing the embodiment, and the repetitive description thereof will be omitted.

<Configuration of Manufacturing System>

FIG. 1 is a schematic diagram showing a thin-film manufacturing system including a stretching machine. A thin-film manufacturing system 1 shown in FIG. 1 includes an extrusion apparatus (extruder, kneading extruder) 2, a T-die 3, a raw sheet cooling apparatus 4, a stretching machine 5, a take-up apparatus 6, and a winder 7.

In the thin-film manufacturing system 1, a thin film is formed through the following process. First, a raw material is supplied to a material supply unit (material supply port, hopper) 2a of the extrusion apparatus 2. The raw material to be supplied to the extrusion apparatus 2 contains a resin material (for example, thermoplastic resin material in pellet shape), additives, and others. The raw material supplied to the extrusion apparatus 2 is conveyed while being kneaded (mixed). Specifically, the raw material supplied to the extrusion apparatus 2 is melt and kneaded while being sent forward by the rotation of a screw in the extrusion apparatus 2. The raw material kneaded by the extrusion apparatus 2 (kneaded material) is supplied to the T-die 3. The kneaded material supplied to the T-die 3 is extruded toward the raw sheet cooling apparatus 4 through a slit of the T-die 3. The kneaded material supplied from the extrusion apparatus 2 to the T-die 3 is formed into a predetermined shape (in this case, film-like shape) by passing through the T-die 3.

The kneaded material extruded from the T-die 3 is cooled in the raw sheet cooling apparatus 4 to be a film 8. The film 8 is a resin film in a solidified state (solid state). More specifically, the film 8 is a thermoplastic resin film. The film 8 is continuously extruded from the T-die 3. As a result, the film 8 is continuously supplied to the stretching machine 5.

The film 8 supplied to the stretching machine 5 is stretched in an MD direction and a TD direction by the stretching machine 5. The film 8 subjected to the stretching process (stretching treatment) by the stretching machine 5 is conveyed to the winder 7 via the take-up apparatus 6 and is wound by the winder 7. The film 8 wound by the winder 7 is cut as appropriate.

The thin-film manufacturing system 1 shown in FIG. 1 manufactures a thin film through the process described above. Understandably, the thin-film manufacturing system 1 can be variously modified in accordance with the properties of the thin film to be manufactured. For example, an extraction tank may be provided near the take-up apparatus 6 shown in FIG. 1, and the plasticizer (for example, paraffin) contained in the film 8 may be removed in some cases.

The stretching machine 5 constituting the thin-film manufacturing system 1 stretches the film 8 in the MD direction and the TD direction while conveying the film 8 in the MD direction. In other words, the MD (Machine Direction) direction is a conveying direction of the film 8. Further, the TD (Transverse Direction) direction is the direction that intersects the conveying direction of the film 8. Thus, in the following description, the MD direction is referred to as a "conveying direction" or a "longitudinal direction", and the TD direction is referred to as a "lateral direction" in some cases. The MD direction (conveying direction, longitudinal direction) and the TD direction (transverse direction) are the directions intersecting each other, and are more specifically the directions orthogonal to each other. Namely, the stretching machine 5 shown in FIG. 1 is a stretching machine capable of simultaneously stretching the film 8 in two directions intersecting each other, and is referred to as a "simultaneous biaxial stretching machine" in general.

<Stretching Machine>

Figure 2:
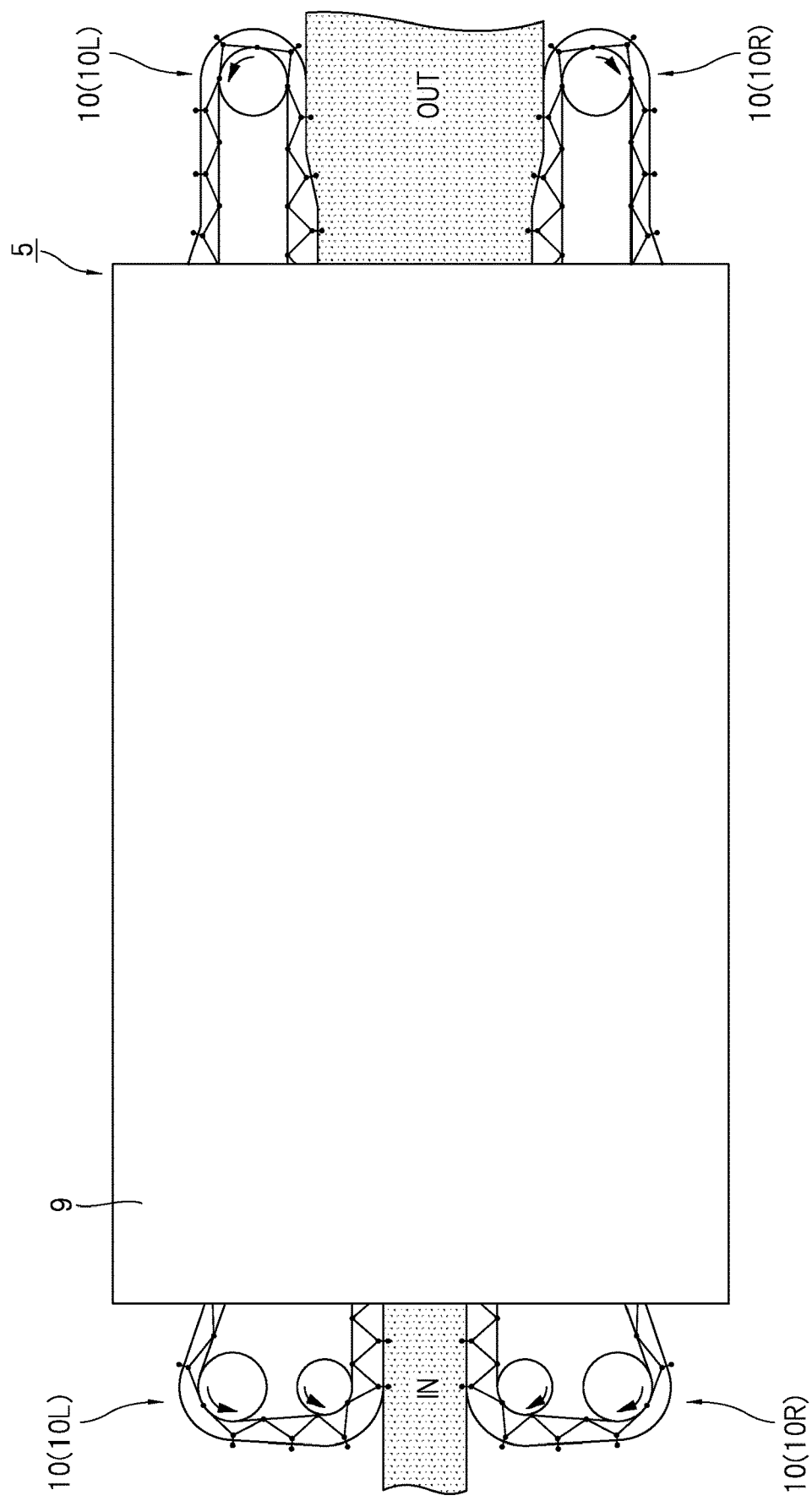
FIG. 2 is a plan view schematically showing a structure of a stretching machine.
Figure 3:
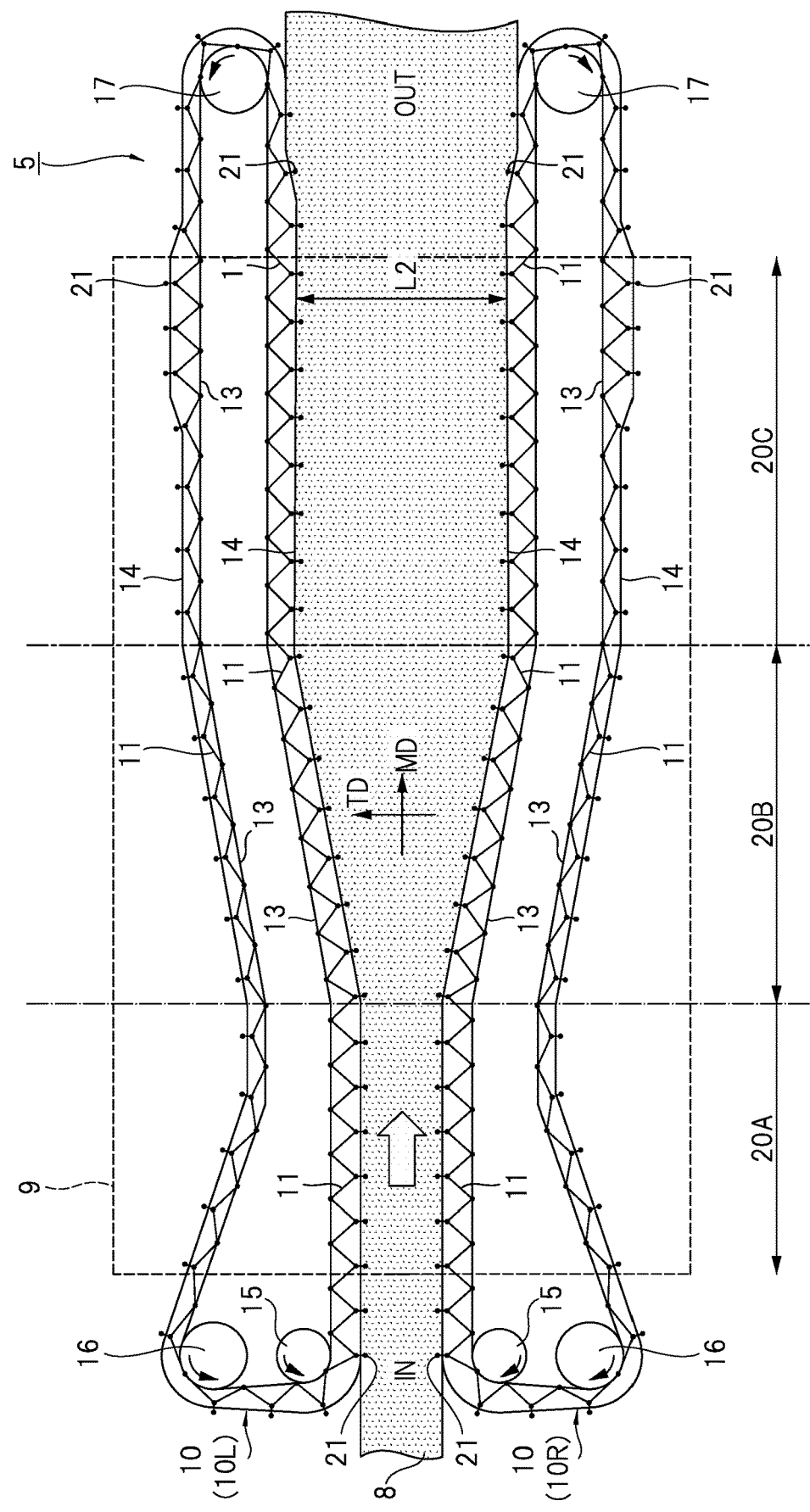
FIG. 3 is another plan view schematically showing the structure of the stretching machine.

FIG. 2 and FIG. 3 are plan views schematically showing the structure of the stretching machine. The stretching machine 5 includes a pair of link devices 10. The pair of link devices 10 is arranged apart from each other in a plan view. In the following description, one of the pair of link devices 10 is referred to as a "link device 10R" and the other of the pair of link devices 10 is referred to as a "link device 10L" in some cases.

In FIG. 2 and FIG. 3, the link device 10R is arranged on the right side (R side) with respect to the conveying direction (MD direction), and the link device 10L is arranged on the left side (L side) with respect to the conveying direction (MD direction). The link device 10R and the link device 10L are separated from each other in the TD direction and face in the TD direction with interposing the film 8 therebetween. The film 8 is conveyed through the space between the link device 10R and the link device 10L in the MD direction. In other words, the space between the link device 10R and the link device 10L facing each other functions as a conveyance path for conveying the film 8.

With reference to FIG. 3, the stretching machine 5 is divided into three regions 20A, 20B, and 20C in the conveying direction (MD direction). The region 20A serves as a preheating region, the region 20B serves as a stretching region, and the region 20C serves as a heat fixing region. The regions 20A, 20B, and 20C are arranged in this order in the conveying direction (MD direction).

The inlet of the film 8 in the stretching machine 5 (portion indicated by "IN" in FIG. 2 and FIG. 3) exists in the region 20A. Further, the outlet of the film 8 in the stretching machine 5 (portion indicated by "OUT" in FIG. 2 and FIG. 3) exists in the region 20C. Also, the region 20B in which the stretching process is performed exists between the region 20A in which the inlet of the film 8 is present and the region 20C in which the outlet of the film 8 is present.

A heat treatment unit 9 covers a part of the region 20A, all of the region 20B, and a part of the region 20C. Also, the heat treatment unit 9 covers the central parts of the link devices 10R and 10L, and heats the film 8 conveyed by the link devices 10R and 10L. The heat treatment unit 9 in this embodiment is composed of an oven capable of heating the film 8 to a desired temperature. The film 8 passes through the inside of the oven as the heat treatment unit 9 while being gripped by the link devices 10R and 10L.

<Link Device>

Each of the link devices 10R and 10L includes a plurality of link mechanisms 11 coupled so as to form an endless chain, and each of the link mechanisms 11 has a clip 21 which is a jig for gripping the film 8. The film 8 is held by the clips 21 in the link mechanisms 11 constituting the link device 10R and the clips 21 in the link mechanisms 11 constituting the link device 10L. Namely, one side (R side/right side) of the film 8 is gripped by the plurality of clips 21 of the link device 10R, and the other side (L side/left side) of the film 8 is gripped by the plurality of clips 21 of the link device 10L.

The link mechanisms 11 of the link devices 10R and 10L run on a pair of rails 13 and 14 arranged on a support table (bed). The rail 14 is arranged outside the rail 13 and surrounds the rail 13. From another viewpoint, the rail 13 is arranged inside the rail 14 and is surrounded by the rail 14. Thus, the rail 13 is referred to as an "inner rail" and the rail 14 is referred to as an "outer rail" in some cases. Also, the rail 13 is referred to also as a "reference rail" or an "SP rail" and the rail 14 is referred to also as an "MD rail" in some cases.

The rails 13 and 14 are annularly arranged over the regions 20A, 20B, and 20C. More specifically, the rails 13 and 14 are turned back in the region 20A in which the inlet of the film 8 is present, are turned back in the region 20C in which the outlet of the film 8 is present, and are annularly arranged over the regions 20A, 20B, and 20C.

The link device 10R has three sprockets 15, 16, and 17 arranged inside the rail 13. Similarly, the link device 10L has three sprockets 15, 16, and 17 arranged inside the rail 13. The sprockets 15 and 16 of the respective link devices 10R and 10L are arranged in a region 20A, and the sprockets 17 of the respective link devices 10R and 10L are arranged in a region 20C. However, the sprockets 15 and 16 are arranged outside the heat treatment unit 9 that covers a part of the region 20A. Further, the sprockets 17 are arranged outside the heat treatment unit 9 that covers a part of the region 20C. Namely, the sprockets 15, 16, and 17 of the respective link devices 10R and 10L are arranged outside the oven as the heat treatment unit 9.

The plurality of link mechanisms 11 in the link devices 10R and 10L are arranged on the rails 13 and 14 in a state of being movable along the rails 13 and 14. The sprockets 15, 16, and 17 of the link device 10R engage with the plurality of link mechanisms 11 of the link device 10R. Therefore, when the sprockets 15, 16, and 17 rotate, a driving force acts on the plurality of link mechanisms 11 of the link device 10R, and the link mechanisms 11 move (run) along the rails 13 and 14.

The sprockets 15, 16, and 17 of the link device 10L engage with the plurality of link mechanisms 11 of the link device 10L. Therefore, when the sprockets 15, 16, and 17 rotate, a driving force acts on the plurality of link mechanisms 11 of the link device 10L, and the link mechanisms 11 move (run) along the rails 13 and 14.

Namely, the rails 13 and 14 are guide rails for moving (running) the plurality of link mechanisms 11 in a predetermined direction.

In the following description, for each of the link devices 10R and 10L shown in FIG. 3, the side facing the film 8 is referred to as a "film side", and the side opposite to the film side is referred to as a "return side" in some cases. Namely, the side on which the plurality of link mechanisms 11 move from the inlet (IN) to the outlet (OUT) while the clips 21 are gripping the film 8 is the film side. Also, the side which is located on the opposite side of the film side and on which the plurality of link mechanisms 11 move from the outlet (OUT) to the inlet (IN) while the clips 21 do not grip the film 8 is the return side.

The interval (pitch) between the adjacent link mechanisms 11 changes in accordance with the interval (separation distance) between the rail 13 and the rail 14. In other words, the interval between the adjacent link mechanisms 11 can be adjusted by adjusting the separation distance between the rail 13 and the rail 14. Note that the interval (pitch) between adjacent link mechanisms 11 is sometimes referred to as "link pitch".

Figure 4:
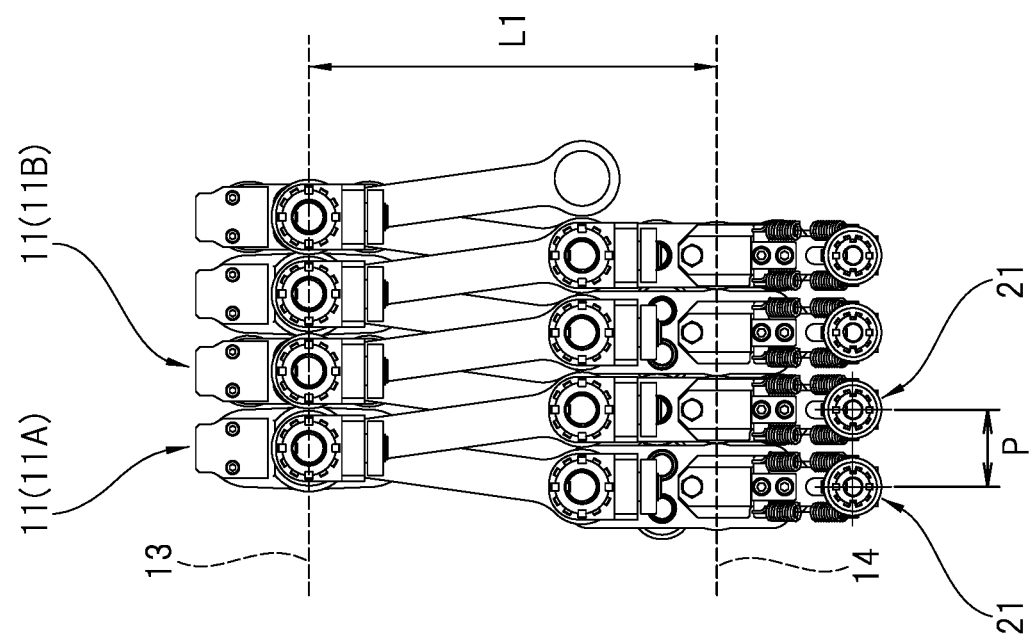
FIG. 4 is a plan view showing a plurality of link mechanisms in a closed state.
Figure 5:
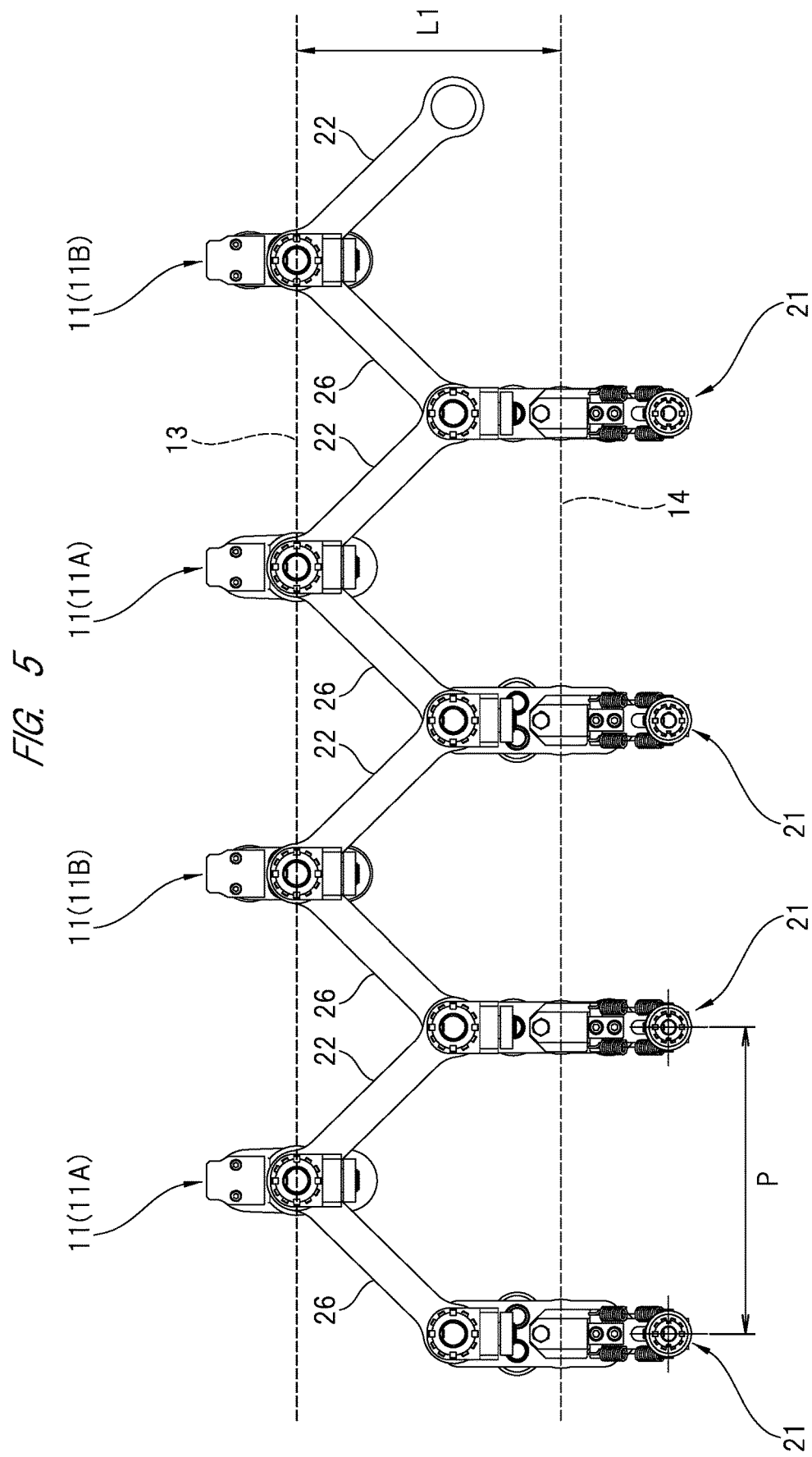
FIG. 5 is a plan view showing a plurality of link mechanisms in an open state.

FIG. 4 is a plan view showing a plurality of link mechanisms in a closed state. FIG. 5 is a plan view showing a plurality of link mechanisms in an open state. As shown in FIG. 4 and FIG. 5, the angle formed by the adjacent link mechanisms 11 becomes larger and the pitch P between the adjacent link mechanisms 11 becomes larger as the separation distance L1 between the rails 13 and 14 becomes smaller. On the other hand, the angle formed by the adjacent link mechanisms 11 becomes smaller and the pitch P between the adjacent link mechanisms 11 becomes smaller as the separation distance L1 between the rails 13 and 14 becomes larger.

Note that the pitch P shown in FIG. 4 is 40 mm, and the pitch P shown in FIG. 5 is 200 mm. Namely, FIG. 5 shows a state in which the link mechanisms 11 shown in FIG. 4 are opened until the magnification in the longitudinal direction increases fivefold. Further, the plurality of link mechanisms 11 shown in FIG. 4 are closed until the adjacent link mechanisms 11 are brought closest to each other. Namely, the minimum pitch between the adjacent link mechanisms 11 is 40 mm.

As described above, each link mechanism 11 has the clip 21 configured to grip the film 8. Therefore, the pitch between the adjacent clips 21 also increases and decreases in accordance with the increase and decrease of the pitch P between the adjacent link mechanisms 11. Specifically, when the separation distance L1 of the rails 13 and 14 decreases, the pitch P of the link mechanisms 11 increases. Then, when the pitch P of the link mechanisms 11 increases, the pitch of the clips 21 also increases (FIG. 4→5). On the other hand, when the separation distance L1 of the rails 13 and 14 increases, the pitch P of the link mechanisms 11 decreases. Then, when the pitch P of the link mechanisms 11 decreases, the pitch of the clips 21 also decreases (FIG. 5→4).

Since each of the plurality of link mechanisms 11 includes the clip 21, the pitch between the two adjacent link mechanisms 11 and the pitch between the two clips 21 provided in these link mechanisms 11 are the same. Namely, the pitch P shown in FIG. 4 and FIG. 5 is not only the pitch between the adjacent link mechanisms 11 but also the pitch between the adjacent clips 21.

<Operation of Stretching Machine>

The film 8 supplied from the raw sheet cooling apparatus 4 to the stretching machine 5 shown in FIG. 1 is gripped by the link devices 10R and 10L at the inlet of the stretching machine 5. Specifically, the film 8 is gripped by the clips 21 included in the link mechanisms 11 of the link devices 10R and 10L shown in FIG. 2 and FIG. 3. More specifically, one side of the film 8 in the width direction is gripped by the clips 21 included in the link mechanisms 11 of the link device 10R, and the other side of the film 8 in the width direction is gripped by the clips 21 included in the link mechanisms 11 of the link device 10L.

The film 8 whose both sides in the width direction are gripped by the clips 21 is conveyed from the inlet to the outlet of the stretching machine 5 along with the movement of the link mechanisms 11 including the clips 21, and passes through the region 20A (preheating region), the region 20B (stretching region), and the region 20C (heat fixing region) in this order. The film 8 is stretched in the MD direction and the TD direction while passing through the region 20B (stretching region). Thereafter, the film 8 reaches the outlet through the region 20C (heat fixing region) and is detached from the clips 21. The film 8 detached from the clips 21 is conveyed to the take-up apparatus 6 and is further conveyed from the take-up apparatus to the winder 7.

As shown in FIG. 3, in the region 20A (preheating region), the interval (separation distance) L2 between the rails 13 and 14 on which the link mechanisms 11 of the link device 10R run and the rails 13 and 14 on which the link mechanisms 11 of the link device 10L run is almost constant. Therefore, the stretching process of the film 8 in the TD direction is not performed in the region 20A. Accordingly, the width (dimension in the TD direction) of the conveyed film 8 does not change and remains constant in the region 20A.

Also, on the film side of the region 20A, the interval (separation distance) L1 between the rail 13 and the rail 14 on which the link mechanisms 11 of the link device 10R run is almost constant. Therefore, on the film side of the region 20A, the pitch P of the link mechanisms 11 of the link device 10R is almost constant, and thus the pitch of clips 21 of the link device 10R is also almost constant.

Further, on the film side of the region 20A, the interval (separation distance) L1 between the rail 13 and the rail 14 on which the link mechanisms 11 of the link device 10L run is also almost constant. Therefore, on the film side of the region 20A, the pitch P of the link mechanisms 11 of the link device 10L is almost constant, and thus the pitch of clips 21 of the link device 10L is also almost constant.

As a result, the stretching process of the film 8 in the MD direction is not performed in the region 20A. Namely, the stretching process of the film 8 in both the TD direction and the MD direction is not performed in the region 20A.

Next, the operation of the stretching machine 5 in the region 20B will be described. In the region 20B, the interval (separation distance) L2 between the rails 13 and 14 on which the link mechanisms 11 of the link device 10R run and the rails 13 and 14 on which the link mechanisms 11 of the link device 10L run gradually increases along the conveying direction (MD direction). Therefore, in the region 20B, the film 8 is pulled and stretched in the TD direction as it advances in the conveying direction (MD direction). In other words, in the region 20B, the width (dimension in the TD direction) of the film 8 gradually increases as it advances in the conveying direction (MD direction).

Also, on the film side of the region 20B, the interval (separation distance) L1 between the rail 13 and the rail 14 on which the link mechanisms 11 of the link device 10R run gradually decreases along the conveying direction (MD direction). Further, on the film side of the region 20B, the interval (separation distance) L1 between the rail 13 and the rail 14 on which the link mechanisms 11 of the link device 10L run also gradually decreases.

Therefore, on the film side of the region 20B, the pitch P of the link mechanisms 11 of the link device 10R gradually increases along the conveying direction (MD direction), and thus the pitch of the clips 21 of the link device 10R also gradually increases. Further, on the film side of the region 20B, the pitch P of the link mechanisms 11 of the link device 10L gradually increases along the conveying direction (MD direction), and thus the pitch of the clips 21 of the link device 10L also gradually increases.

As a result, in the region 20B, the film 8 is pulled and stretched in the MD direction as it advances in the conveying direction (MD direction). Therefore, in the region 20B, the film 8 is stretched in the TD direction and the MD direction as it advances in the conveying direction (MD direction). Namely, in the region 20B, the stretching process in the TD direction and the MD direction is applied to the film 8.

Next, the operation of the stretching machine 5 in the region 20C will be described. In the region 20C, the interval (separation distance) L2 between the rails 13 and 14 on which the link mechanisms 11 of the link device 10R run and the rails 13 and 14 on which the link mechanisms 11 of the link device 10L run is almost constant. Therefore, the stretching process of the film 8 in the TD direction is not performed in the region 20C. Accordingly, the width (dimension in the TD direction) of the conveyed film 8 does not change and remains constant in the region 20C.

Further, on the film side of the region 20C, the interval (separation distance) L1 between the rail 13 and the rail 14 on which the link mechanisms 11 of the link device 10R run is almost constant. Therefore, on the film side of the region 20C, the pitch P of the link mechanisms 11 of the link device 10R is almost constant, and thus the pitch of clips 21 of the link device 10R is also almost constant.

Similarly, on the film side of the region 20C, the interval (separation distance) L1 between the rail 13 and the rail 14 on which the link mechanisms 11 of the link device 10L run is almost constant. Therefore, on the film side of the region 20C, the pitch P of the link mechanisms 11 of the link device 10L is almost constant, and thus the pitch of clips 21 of the link device 10L is also almost constant.

As a result, the stretching process of the film 8 in the MD direction is not performed in the region 20C. Namely, the stretching process of the film 8 in both the TD direction and the MD direction is not performed in the region 20C.

As described above, on the film side of the region 20A, the pitch P of the link mechanisms 11 of the link device 10R is kept constant, and the pitch P of the link mechanisms 11 of the link device 10L is also kept constant. Thereafter, on the film side of the region 20B, the pitch P of the link mechanisms 11 of the link device 10R and the pitch P of the link mechanisms 11 of the link device 10L are gradually expanded. Then, on the film side of the region 20C, the pitch P of the link mechanisms 11 of the link device 10R is kept constant again, and the pitch P of the link mechanisms 11 of the link device 10L is also kept constant again. Therefore, the pitch P of the link mechanisms 11 on the film side of the region 20C is larger than the pitch P of the link mechanisms 11 on the film side of the region 20A. From another viewpoint, the pitch of the clips 21 on the film side of the region 20C is larger than the pitch of the clips 21 on the film side of the region 20A. From still another viewpoint, the separation distance L1 between the rails 13 and 14 on which the link mechanisms 11 of each of the link devices 10R and 10L run in the region 20C is smaller than the separation distance L1 between the rails 13 and 14 on which the link mechanisms 11 of each of the link devices 10R and 10L run in the region 20A.

<Link Mechanism>

Figure 6:
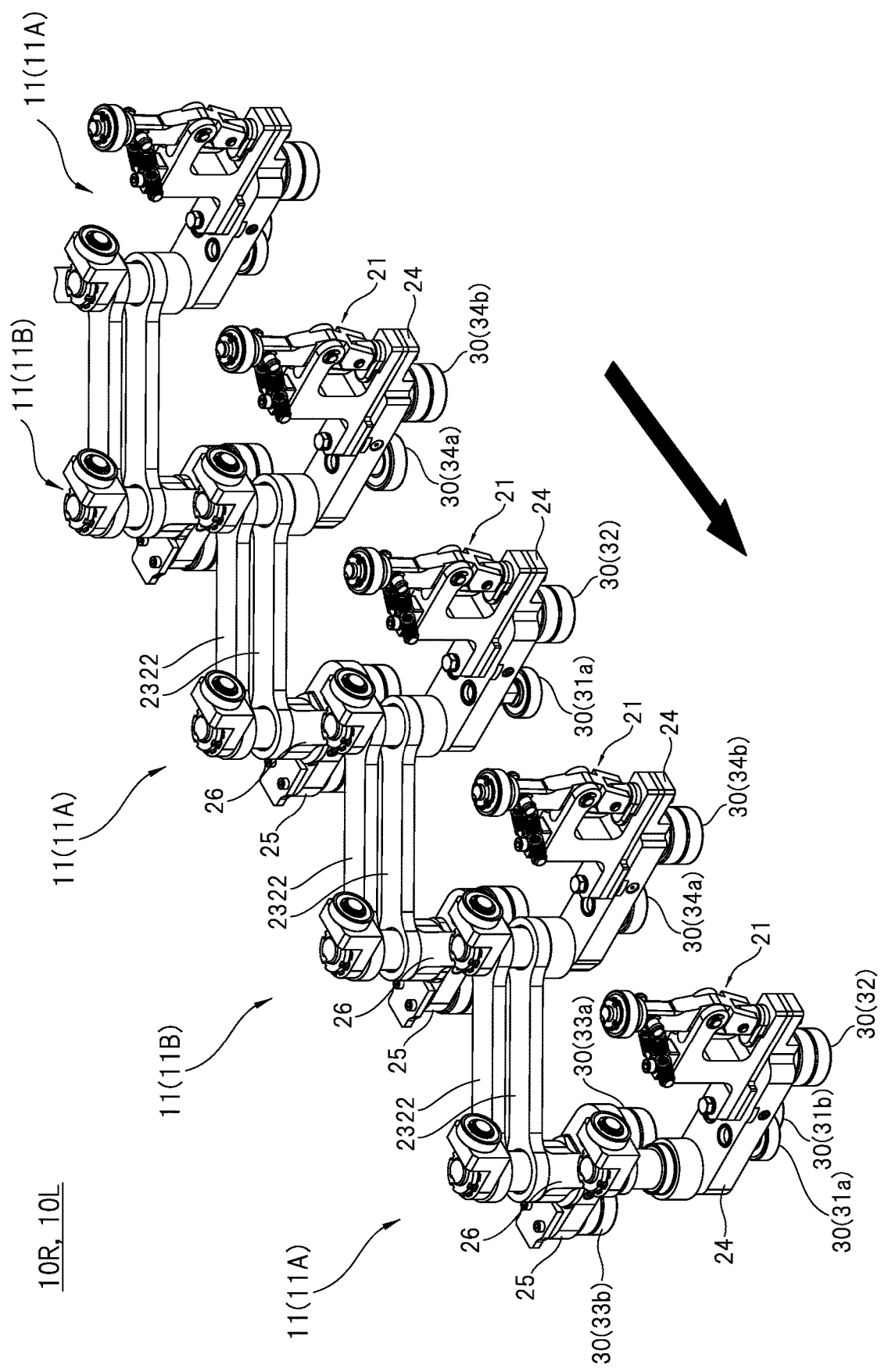
FIG. 6 is a top perspective view showing a part of the plurality of link mechanisms.
Figure 7:
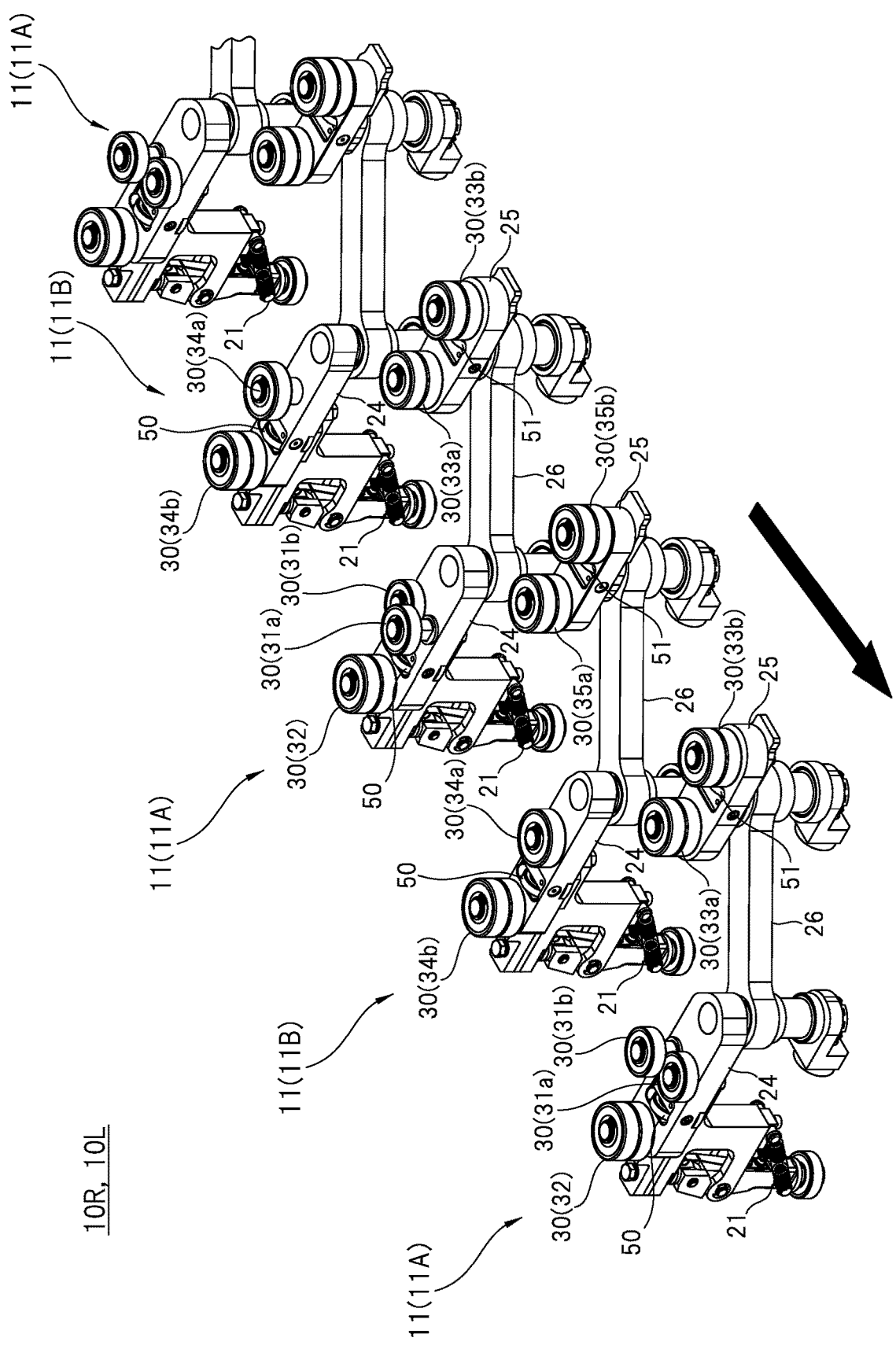
FIG. 7 is a bottom perspective view showing a part of the plurality of link mechanisms.

FIG. 6 is a top perspective view showing a part of the plurality of link mechanisms. FIG. 7 is a bottom perspective view showing a part of the plurality of link mechanisms. Each of the plurality of link mechanisms 11 of the link devices 10R and 10L includes an upper link plate 22, a lower link plate 23, a pair of rail holders 24 and 25, and a base member 26 bridging the pair of rail holders 24 and 25 in addition to the clip 21. One rail holder 24 is arranged on the rail 14, and the other rail holder 25 is arranged on the rail 13.

The upper link plate 22 and the lower link plate 23 are plate-shaped members that extend linearly in a plan view. The base member 26 is common with the upper link plate 22 and the lower link plate 23 in that it extends linearly in a plan view, but the base member 26 is thicker than these.

One ends of the upper link plate 22 and the lower link plate 23 of each link mechanism 11 are rotatably coupled to the rail holder 25 of the link mechanism 11. On the other hand, the other ends of the upper link plate 22 and the lower link plate 23 of each link mechanism 11 are rotatably coupled to the rail holder 24 of the adjacent link mechanism 11.

One end of the base member 26 of each link mechanism 11 is rotatably coupled to the rail holder 24 of the link mechanism 11, and the other end of the base member 26 of each link mechanism 11 is rotatably coupled to the rail holder 25 of the link mechanism 11.

The rail holders 24 and 25 of each link mechanism 11 are provided with a plurality of guide rollers 30 that move along the rails 13 and 14 while rotating. However, the total number of guide rollers 30 is different between the two adjacent link mechanisms 11.

Specifically, the rail holder 24 of a certain link mechanism 11 is provided with three guide rollers 30, but the rail holder 24 of another link mechanism 11 arranged before or after that link mechanism 11 is provided with two guide rollers 30. From another viewpoint, the rail holder 24 of a certain link mechanism 11 is provided with two guide rollers 30, but the rail holder 24 of another link mechanism 11 arranged before or after that link mechanism 11 is provided with three guide rollers 30.

On the other hand, two guide rollers 30 are provided on the rail holders 25 of all the link mechanisms 11. Namely, in the link devices 10R and 10L, the link mechanisms 11 each having a total of five guide rollers 30 and the link mechanisms 11 each having a total of four guide rollers 30 are alternately arranged. More specifically, the link mechanisms 11 each having the rail holder 24 provided with the three guide rollers 30 and the link mechanisms 11 each having the rail holder 24 provided with the two guide rollers 30 are alternately arranged.

In the following description, the link mechanism 11 having the rail holder 24 provided with three guide rollers 30 is referred to as a "three-roller link mechanism 11A" and the link mechanism 11 having the rail holder 24 provided with two guide rollers 30 is referred to as a "two-roller link mechanism 11B" in some cases.

<Three-Roller Link Mechanism (Coupling Structure of Two Rail Holders>

Figure 8:
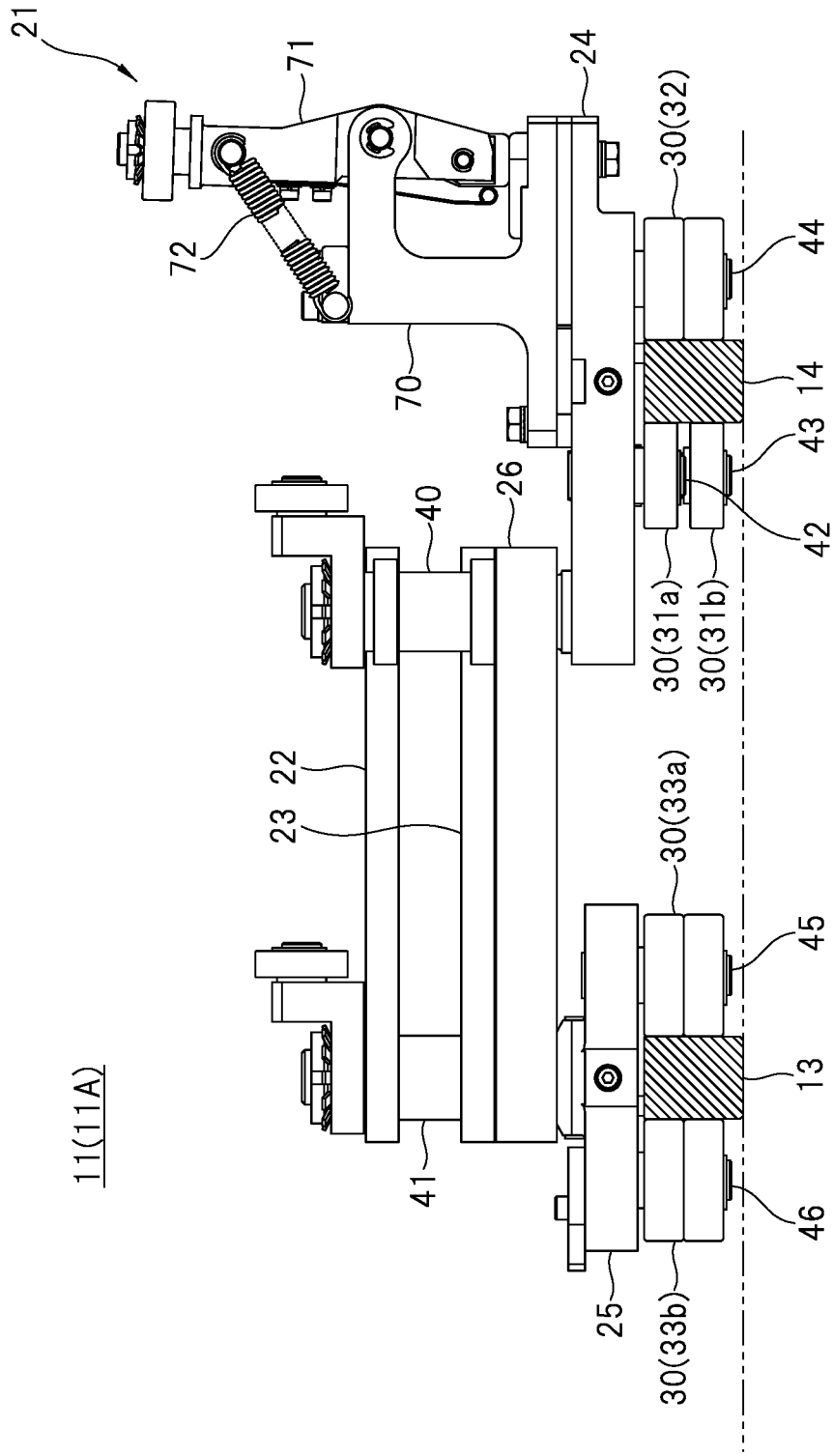
FIG. 8 is an enlarged view showing one three-roller link mechanism.

FIG. 8 is an enlarged view showing one three-roller link mechanism. The rail holder 24 of the three-roller link mechanism 11A is arranged on the rail 14 so as to straddle the rail 14. At this time, the center of the rail holder 24 in the longitudinal direction is arranged directly above or substantially directly above the rail 14. Therefore, one end side of the rail holder 24 in the longitudinal direction protrudes to the inner side of the rail 14 (the side facing the rail 13), and the other end side of the rail holder 24 in the longitudinal direction protrudes to the outer side of the rail 14 (the side opposite to the side facing the rail 13).

The rail holder 25 of the three-roller link mechanism 11A is arranged on the rail 13 so as to straddle the rail 13. At this time, the center of the rail holder 25 in the longitudinal direction is arranged directly above or substantially directly above the rail 13. Therefore, one end side of the rail holder 25 in the longitudinal direction protrudes to the inner side of the rail 13 (the side facing the rail 14), and the other end side of the rail holder 25 in the longitudinal direction protrudes to the outer side of the rail 13 (the side opposite to the side facing the rail 14).

The rail holder 24 is provided with a link shaft 40 to which one end of the base member 26 is rotatably coupled, and the rail holder 25 is provided with a link shaft 41 to which the other end of the base member 26 is rotatably coupled. The link shaft 40 is provided on one end side of the rail holder 24 protruding to the inner side of the rail 14. On the other hand, the link shaft 41 is provided at the center of the rail holder in the longitudinal direction located directly above or substantially directly above the rail 13.

In addition to one end of the base member 26, one ends of the upper link plate 22 and the lower link plate 23 are also rotatably coupled to the link shaft 41 provided on the rail holder 25. Note that the other ends of the upper link plate 22 and the lower link plate 23 are rotatably coupled to the link shaft 40 provided on the rail holder 24 of another adjacent link mechanism 11 (two-roller link mechanism 11B).

The link shaft 40 is a link axis on the side with the rail 14. Further, the link shaft 41 is a link axis on the side with the rail 13. The link shaft 40 is provided on one end side of the rail holder 24 protruding to the inner side of the rail 14. Therefore, in the three-roller link mechanism 11A, the link axis on the side with the rail 14 is off the center of the rail 14. On the other hand, the link shaft 41 is provided at the center of the rail holder 25 in the longitudinal direction located directly above or substantially directly above the rail 13. Therefore, in the three-roller link mechanism 11A, the link axis on the side with the rail 13 coincides with the center of the rail 13. Note that the clip 21 is provided at the end of the rail holder 24 protruding to the outer side of the rail 14.

<Three-Roller Link Mechanism (Guide Rollers Provided on One Rail Holder>

The rail holder 24 of the three-roller link mechanism 11A is provided with three roller shafts 42, 43, and 44 parallel to each other. When the rail holder 24 is arranged on the rail 14, the roller shafts 42 and 43 are arranged on one side (inner side) of the rail 14, and the roller shaft 44 is arranged on the other side (outer side) of the rail 14.

Parts of the roller shafts 42, 43, and 44 are press-fitted into the rail holder 24, and the other parts of the roller shafts 42, 43, and 44 protrude below the rail holder 24. The guide rollers 30 are rotatably mounted on the protruding portions of the roller shafts 42, 43, and 44 that protrude below the rail holder 24.

Specifically, the guide rollers 30 having the same outer diameter are rotatably mounted on the roller shafts 42 and 43. The guide roller 30 having a larger outer diameter than those of the guide rollers 30 mounted on the roller shafts 42 and 43 is rotatably mounted on the roller shaft 44.

In the following description, the guide roller 30 mounted on the roller shaft 42 is referred to as a "small-diameter guide roller 31*a*", the guide roller 30 mounted on the roller shaft 43 is referred to as a "small-diameter guide roller 31*b*", and the guide roller 30 mounted on the roller shaft 44 is referred to as a "large-diameter guide roller 32" in some cases. Note that the outer diameter of the small-diameter guide roller 31*a* and the small-diameter guide roller 31*b* is 32 mm, and the outer diameter of the large-diameter guide roller 32 is 37 mm.

Understandably, the three guide rollers 30 provided on the rail holder 24 are common in that they are the outer rings of the rolling bearings mounted on the shafts. Therefore, the small-diameter guide roller 31*a* rotates with the roller shaft 42 as a rotation axis, and the small-diameter guide roller 31*b* rotates with the roller shaft 43 as a rotation axis. Further, the large-diameter guide roller 32 rotates with the roller shaft 44 as a rotation axis.

The small-diameter guide roller 31*a* and the small-diameter guide roller 31*b* are arranged at different heights in the direction of the rotation axis. Further, the small-diameter guide roller 31*a* and the small-diameter guide roller 31*b* partially overlap with each other in the radial direction.

In the three-roller link mechanism 11A shown in FIG. 8, the small-diameter guide roller 31*a* is arranged at a position higher than the small-diameter guide roller 31*b* in the direction of the rotation axis. In other words, the small-diameter guide roller 31*b* is arranged at a position lower than the small-diameter guide roller 31*a* in the direction of the rotation axis. From another viewpoint, the small-diameter guide roller 31*a* and the small-diameter guide roller 31*b* are arranged at different levels.

The vertical relationship between the small-diameter guide roller 31*a* and the small-diameter guide roller 31*b* described above differs depending on the three-roller link mechanisms 11A. It is assumed that the five link mechanisms 11 shown in FIG. 6 and FIG. 7 move (run) in the direction of the arrows in FIG. 6 and FIG. 7. The vertical relationship between the small-diameter guide roller 31*a* and the small-diameter guide roller 31*b* of the three-roller link mechanism 11A located at the first position (head) in the moving direction is the same as the vertical relationship shown in FIG. 8. Namely, the small-diameter guide roller 31*a* is arranged at a higher position, and the small-diameter guide roller 31*b* is arranged at a lower position.

On the other hand, the vertical relationship between the small-diameter guide roller 31*a* and the small-diameter guide roller 31*b* of the three-roller link mechanism 11A located at the second position (third position among all the link mechanisms 11) is reverse to the vertical relationship shown in FIG. 8. Namely, the small-diameter guide roller 31*a* is arranged at a lower position, and the small-diameter guide roller 31*b* is arranged at a higher position.

In short, the three-roller link mechanism 11A in which the small-diameter guide roller 31*a* is arranged at a higher position and the small-diameter guide roller 31*b* is arranged at a lower position and the three-roller link mechanism 11A in which the small-diameter guide roller 31*a* is arranged at a lower position and the small-diameter guide roller 31*b* is arranged at a higher position are arranged alternately. Understandably, the two-roller link mechanism 11B is interposed between the two adjacent three-roller link mechanisms 11A.

In the three-roller link mechanism 11A in which the small-diameter guide roller 31*a* is arranged at a higher position and the small-diameter guide roller 31*b* is arranged at a lower position, a gap equal to or larger than the thickness of the small-diameter guide roller 31*a* is present between the rail holder 24 and the small-diameter guide roller 31*b*. On the other hand, in the three-roller link mechanism 11A in which the small-diameter guide roller 31*a* is arranged at a lower position and the small-diameter guide roller 31*b* is arranged at a higher position, a gap equal to or larger than the thickness of the small-diameter guide roller 31b is present between the rail holder 24 and the small-diameter guide roller 31a.

A support roller 50 (FIG. 7) is rotatably provided in the rail holder 24. The support roller 50 is arranged between the small-diameter guide rollers 31a and 31b and the large-diameter guide roller 32 in the longitudinal direction of the rail holder 24. Further, the rotation axis of the support roller 50 is orthogonal to the rotation axes of the small-diameter guide rollers 31a and 31b and the large-diameter guide roller 32.

When the rail holder 24 moves on the rail 14, the small-diameter guide rollers 31a and 31b move along the inner side surface of the rail 14 while rotating. When the rail holder 24 moves on the rail 14, the large-diameter guide roller 32 moves along the outer side surface of the rail 14 while rotating. When the rail holder 24 moves on the rail 14, the support roller 50 moves on the upper surface of the rail 14 while rotating.

The support roller 50 is always in contact with the upper surface of the rail 14 and supports the rail holder 24. On the other hand, in order to realize smoother movement of the rail holder 24, a slight gap (clearance) is provided between the small-diameter guide rollers 31a and 31b and the inner side surface of the rail 14. For the same reason, a slight gap (clearance) is provided also between the large-diameter guide roller 32 and the outer side surface of the rail 14.

<Three-Roller Link Mechanism (Guide Rollers Provided on the Other Rail Holder>

With reference to FIG. 8 again, the rail holder 25 of the three-roller link mechanism 11A is provided with two roller shafts 45 and 46 parallel to each other. When the rail holder 25 is arranged on the rail 13, the roller shaft 45 is arranged on one side (inner side) of the rail 13, and the roller shaft 46 is arranged on the other side (outer side) of the rail 13.

Parts of the roller shafts 45 and 46 are press-fitted into the rail holder 25, and the other parts of the roller shafts 45 and 46 protrude below the rail holder 25. The guide rollers 30 are rotatably mounted on the protruding portions of the roller shafts 45 and 46 that protrude below the rail holder 25.

Specifically, the guide rollers 30 having the same outer diameter as that of the large-diameter guide roller 32 are rotatably mounted on the roller shafts 45 and 46. In the following description, the guide roller 30 mounted on the roller shaft 45 is referred to as a "large-diameter guide roller 33a" and the guide roller 30 mounted on the roller shaft 46 is referred to as a "large-diameter guide roller 33b" in some cases.

Understandably, the two guide rollers 30 provided on the rail holder 25 are common in that they are the outer rings of the rolling bearings mounted on the shafts. Therefore, the large-diameter guide roller 33a rotates with the roller shaft 45 as a rotation axis. Further, the large-diameter guide roller 33b rotates with the roller shaft 46 as a rotation axis.

A support roller 51 (FIG. 7) is rotatably provided in the rail holder 25. The support roller 51 is arranged between the large-diameter guide roller 33a and the large-diameter guide roller 33b in the longitudinal direction of the rail holder 25. Further, the rotation axis of the support roller 51 is orthogonal to the rotation axes of the large-diameter guide rollers 33a and 33b.

When the rail holder 25 moves on the rail 13, the large-diameter guide roller 33a moves along the inner side surface of the rail 13 while rotating. When the rail holder 25 moves on the rail 13, the large-diameter guide roller 33b moves along the outer side surface of the rail 13 while rotating. When the rail holder 25 moves on the rail 13, the support roller 51 moves on the upper surface of the rail 13 while rotating.

The support roller 51 is always in contact with the upper surface of the rail 13 and supports the rail holder 25. On the other hand, in order to realize smoother movement of the rail holder 25, a slight gap (clearance) is provided between the large-diameter guide roller 33a and the inner side surface of the rail 13. For the same reason, a slight gap (clearance) is provided also between the large-diameter guide roller 33b and the outer side surface of the rail 13.

<Two-Roller Link Mechanism (Coupling Structure of Two Rail Holders>

Figure 9:
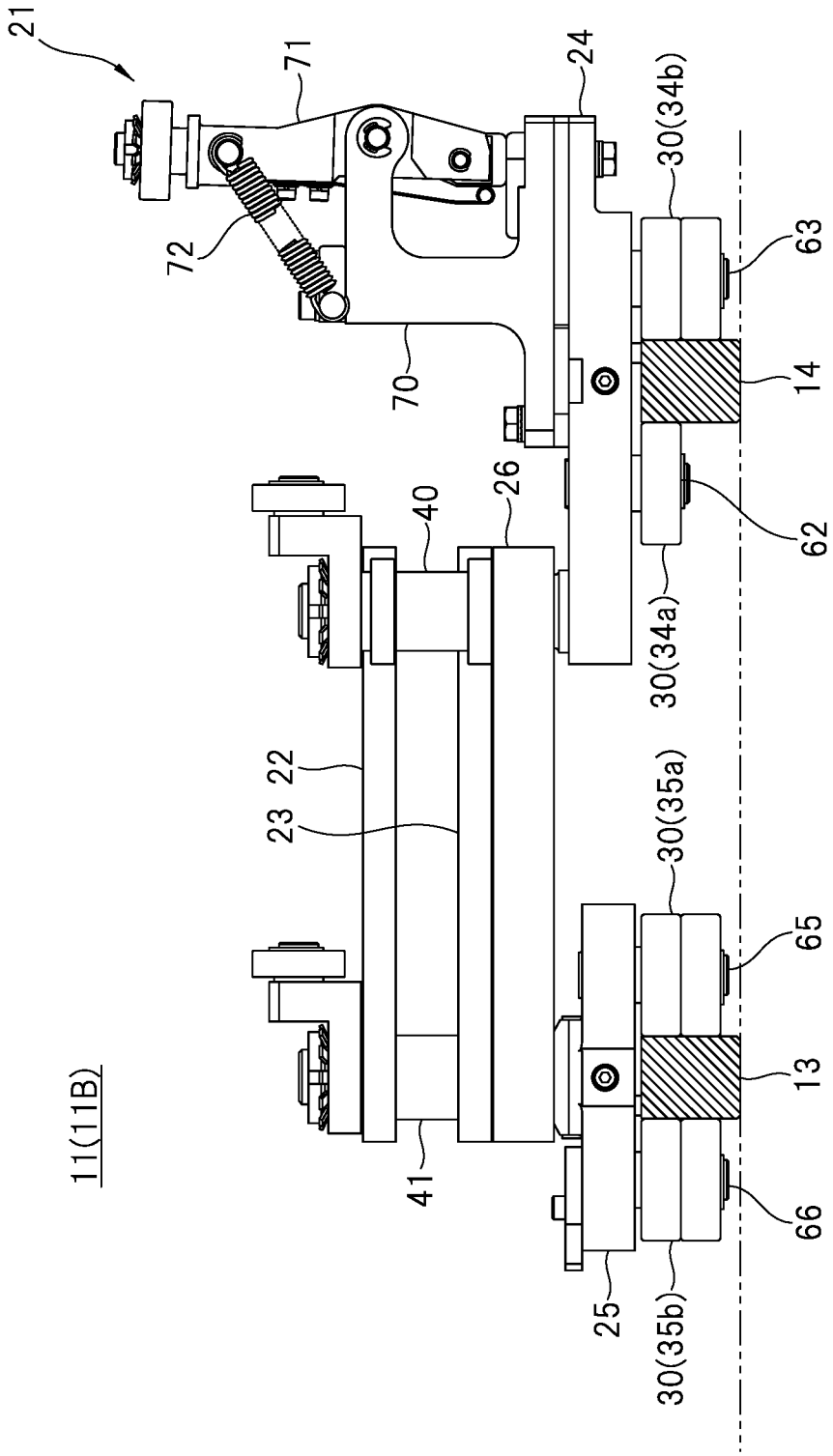
FIG. 9 is an enlarged view showing one two-roller link mechanism.

FIG. 9 is an enlarged view showing one two-roller link mechanism. The rail holder 24 of the two-roller link mechanism 11B is arranged on the rail 14 so as to straddle the rail 14. At this time, the center of the rail holder 24 in the longitudinal direction is arranged directly above or substantially directly above the rail 14. Therefore, one end side of the rail holder 24 in the longitudinal direction protrudes to the inner side of the rail 14 (the side facing the rail 13), and the other end side of the rail holder 24 in the longitudinal direction protrudes to the outer side of the rail 14 (the side opposite to the side facing the rail 13).

The rail holder 25 of the two-roller link mechanism 11B is arranged on the rail 13 so as to straddle the rail 13. At this time, the center of the rail holder 25 in the longitudinal direction is arranged directly above or substantially directly above the rail 13. Therefore, one end side of the rail holder 25 in the longitudinal direction protrudes to the inner side of the rail 13 (the side facing the rail 14), and the other end side of the rail holder 25 in the longitudinal direction protrudes to the outer side of the rail 13 (the side opposite to the side facing the rail 14).

The rail holder 24 is provided with the link shaft 40 to which one end of the base member 26 is rotatably coupled, and the rail holder 25 is provided with the link shaft 41 to which the other end of the base member 26 is rotatably coupled. The link shaft 40 is provided on one end side of the rail holder 24 protruding to the inner side of the rail 14. On the other hand, the link shaft 41 is provided at the center of the rail holder in the longitudinal direction located directly above or substantially directly above the rail 13.

In addition to one end of the base member 26, one ends of the upper link plate 22 and the lower link plate 23 are also rotatably coupled to the link shaft 41 provided on the rail holder 25. Note that the other ends of the upper link plate 22 and the lower link plate 23 are rotatably coupled to the rail holder 24 of the adjacent link mechanism 11 (three-roller link mechanism 11A).

The link shaft 40 is a link axis on the side with the rail 14. Further, the link shaft 41 is a link axis on the side with the rail 13. The link shaft 40 is provided on one end side of the rail holder 24 protruding to the inner side of the rail 14. Therefore, in the two-roller link mechanism 11B, the link axis on the side with the rail 14 is off the center of the rail 14. On the other hand, the link shaft 41 is provided at the center of the rail holder 25 in the longitudinal direction located directly above or substantially directly above the rail 13. Therefore, in the two-roller link mechanism 11B, the link axis on the side with the rail 13 coincides with the center of the rail 13.

As described above, the link axis on the side with the rail 14 of the three-roller link mechanism 11A is off the center of the rail 14, and the link axis on the side with the rail 13 coincides with the center of the rail 13. Namely, in this embodiment, the link axes on the side with the MD rail of the link devices 10R and 10L are off the center of the rail, and the link axes on the side with the SP rail coincide with the center of the rail.

Note that the clip 21 of the two-roller link mechanism 11B is provided at the end of the rail holder 24 protruding to the outer side of the rail 14 as with the clip 21 of the three-roller link mechanism 11A.

<Two-Roller Link Mechanism (Guide Rollers Provided on One Rail Holder>

The rail holder 24 of the two-roller link mechanism 11B is provided with two roller shafts 62 and 63 parallel to each other. When the rail holder 24 is arranged on the rail 14, the roller shaft 62 is arranged on one side (inner side) of the rail 14, and the roller shaft 62 is arranged on the other side (outer side) of the rail 14.

Parts of the roller shafts 62 and 63 are press-fitted into the rail holder 24, and the other parts of the roller shafts 62 and 63 protrude below the rail holder 24. The guide rollers 30 are rotatably mounted on the protruding portions of the roller shafts 62 and 63 that protrude below the rail holder 24.

Specifically, the guide rollers 30 having the same outer diameter as that of the large-diameter guide roller 32 of the three-roller link mechanism 11A are rotatably mounted on the roller shafts 62 and 63. In the following description, the guide roller 30 mounted on the roller shaft 62 is referred to as a "large-diameter guide roller 34a" and the guide roller 30 mounted on the roller shaft 63 is referred to as a "large-diameter guide roller 34b" in some cases.

Understandably, the two guide rollers 30 provided on the rail holder 24 are common in that they are the outer rings of the rolling bearings mounted on the shafts. Therefore, the large-diameter guide roller 34a rotates with the roller shaft 62 as a rotation axis. Further, the large-diameter guide roller 34b rotates with the roller shaft 63 as a rotation axis.

Heights of the large-diameter guide rollers 34a are different between the two adjacent two-roller link mechanisms 11B interposing the three-roller link mechanism 11A therebetween. The large-diameter guide roller 34a of the two-roller link mechanism 11B shown in FIG. 9 is arranged at a higher position in the direction of the rotation axis than the large-diameter guide rollers 34a of the other adjacent two-roller link mechanisms 11B.

It is assumed that the five link mechanisms 11 shown in FIG. 6 and FIG. 7 move (run) in the direction of the arrows in FIG. 6 and FIG. 7. The large-diameter guide roller 34a of the two-roller link mechanism 11B located at the first position (second position among all the link mechanisms 11) in the moving direction is arranged at the same position (higher position) as the large-diameter guide roller 34a shown in FIG. 9 in the direction of the rotation axis.

On the other hand, the large-diameter guide roller 34a of the two-roller link mechanism 11B located at the second position (fourth position among all the link mechanisms 11) is arranged at a position lower than the large-diameter guide roller 34a shown in FIG. 9 in the direction of the rotation axis (lower position).

Namely, the two-roller link mechanism 11B in which the large-diameter guide roller 34a is arranged at a higher position and the two-roller link mechanism 11B in which the large-diameter guide roller 34a is arranged at a lower position are arranged alternately. Understandably, the three-roller link mechanism 11A is interposed between the two adjacent two-roller link mechanisms 11B.

In the two-roller link mechanism 11B in which the large-diameter guide roller 34a is arranged at a lower position, a gap equal to or larger than the thickness of the large-diameter guide roller 34a is present between the rail holder 24 and the large-diameter guide roller 34a.

The support roller 50 (FIG. 7) is rotatably provided also in the rail holder 24 of the two-roller link mechanism 11B. The support roller 50 is arranged between the two large-diameter guide rollers 34a and 34b in the longitudinal direction of the rail holder 24. Further, the rotation axis of the support roller 50 is orthogonal to the rotation axes of the large-diameter guide rollers 34a and 34b.

When the rail holder 24 moves on the rail 14, the large-diameter guide roller 34a moves along the inner side surface of the rail 14 while rotating, and the large-diameter guide roller 34b moves along the outer side surface of the rail 14 while rotating. When the rail holder 24 moves on the rail 14, the support roller 50 moves on the upper surface of the rail 14 while rotating.

The support roller 50 is always in contact with the upper surface of the rail 14 and supports the rail holder 24. On the other hand, in order to realize smoother movement of the rail holder 24, a slight gap (clearance) is provided between the large-diameter guide roller 34a and the inner side surface of the rail 14. For the same reason, a slight gap (clearance) is provided also between the large-diameter guide roller 34b and the outer side surface of the rail 14.

<Two-Roller Link Mechanism (Guide Rollers Provided on the Other Rail Holder>

With reference to FIG. 9 again, the rail holder 25 of the two-roller link mechanism 11B is provided with two roller shafts 65 and 66 parallel to each other. When the rail holder 25 is arranged on the rail 13, the roller shaft 65 is arranged on one side (inner side) of the rail 13, and the roller shaft 66 is arranged on the other side (outer side) of the rail 13.

Parts of the roller shafts 65 and 66 are press-fitted into the rail holder 25, and the other parts of the roller shafts 65 and 66 protrude below the rail holder 25. The guide rollers 30 are rotatably mounted on the protruding portions of the roller shafts 65 and 66 that protrude below the rail holder 25.

Specifically, the guide rollers 30 having the same outer diameter as those of the large-diameter guide rollers 34a and 34b are rotatably mounted on the roller shafts 65 and 66. In the following description, the guide roller 30 mounted on the roller shaft 65 is referred to as a "large-diameter guide roller 35a" and the guide roller 30 mounted on the roller shaft 66 is referred to as a "large-diameter guide roller 35b" in some cases.

Understandably, the two guide rollers 30 provided on the rail holder 25 are common in that they are the outer rings of the rolling bearings mounted on the shafts. Therefore, the large-diameter guide roller 35a rotates with the roller shaft 65 as a rotation axis. Further, the large-diameter guide roller 35b rotates with the roller shaft 66 as a rotation axis.

The support roller 51 (FIG. 7) is rotatably provided also in the rail holder 25 of the two-roller link mechanism 11B. The support roller 51 is arranged between the two large-diameter guide rollers 35a and 35b in the longitudinal direction of the rail holder 25. Further, the rotation axis of the support roller 51 is orthogonal to the rotation axes of the large-diameter guide rollers 35a and 35b.

When the rail holder 25 moves on the rail 13, the large-diameter guide roller 35a moves along the inner side surface of the rail 13 while rotating. When the rail holder 25 moves on the rail 13, the large-diameter guide roller 35b moves along the outer side surface of the rail 13 while rotating. When the rail holder 25 moves on the rail 13, the support roller 51 moves on the upper surface of the rail 13 while rotating.

The support roller 51 is always in contact with the upper surface of the rail 13 and supports the rail holder 25. On the other hand, in order to realize smoother movement of the rail holder 25, a slight gap (clearance) is provided between the large-diameter guide roller 35a and the inner side surface of the rail 13. For the same reason, a slight gap (clearance) is provided also between the large-diameter guide roller 35b and the outer side surface of the rail 13.

<Clip>

The clip 21 provided on each link mechanism 11 includes a main body portion 70, a grip portion 71, a spring portion 72, and others. The main body portion 70 is fixed to the rail holder 24. The grip portion 71 is attached to the main body portion 70 so as to operate vertically. The spring portion 72 biases the grip portion 71 so as to operate the grip portion 71 downward. By making the grip portion 71 operate downward by the biasing force of the spring portion 72, the film 8 is sandwiched between the main body portion 70 and the grip portion 71. Namely, the film 8 is gripped by the clip 21. On the other hand, by making the grip portion 71 operate upward against the biasing force of the spring portion 72, the film 8 is released from the clip 21.

<Positional Relationship of Guide Rollers when Link Mechanisms Are Closed>

FIG. 10 is an explanatory diagram showing a positional relationship of guide rollers when the plurality of link mechanisms are closed to the minimum pitch.

In this embodiment, the adjacent three-roller link mechanism 11A and two-roller link mechanism 11B can be brought close to each other until the guide rollers 30 thereof partially overlap with each other.

As described above, the three-roller link mechanisms 11A and the two-roller link mechanisms 11B are arranged alternately. When focusing only on the three-roller link mechanisms 11A, the three-roller link mechanism 11A in which the small-diameter guide roller 31a is arranged at a higher position and the small-diameter guide roller 31b is arranged at a lower position and the three-roller link mechanism 11A in which the small-diameter guide roller 31a is arranged at a lower position and the small-diameter guide roller 31b is arranged at a higher position are arranged alternately.

Further, when focusing only on the two-roller link mechanisms 11B, the two-roller link mechanism 11B in which the large-diameter guide roller 34a is arranged at a higher position and the two-roller link mechanism 11B in which the large-diameter guide roller 34a is arranged at a lower position are arranged alternately.

When the link mechanisms 11 are closed, the large-diameter guide roller 34a ("A") arranged at a higher position of the two-roller link mechanism 11B overlaps with the small-diameter guide rollers 31a and 31b arranged at a lower position of the front and rear three-roller link mechanisms 11A. More specifically, a part of the large diameter guide roller 34a of the two-roller link mechanism 11B in the radial direction overlaps above parts of the small-diameter guide rollers 31a and 31b of the front and rear three-roller link mechanisms 11A in the radial direction.

Also, when the link mechanisms 11 are closed, the large-diameter guide roller 34a ("B") arranged at a lower position of the two-roller link mechanism 11B overlaps with the small-diameter guide rollers 31a and 31b arranged at a higher position of the front and rear three-roller link mechanisms 11A. More specifically, a part of the large diameter guide roller 34a of the two-roller link mechanism 11B in the radial direction overlaps under parts of the small-diameter guide rollers 31a and 31b of the front and rear three-roller link mechanisms 11A in the radial direction.

From another viewpoint, parts of the small-diameter guide rollers 31a and 31b arranged at a higher position of the three-roller link mechanisms 11A in the radial direction enter between the large-diameter guide roller 34a arranged at a lower position and the rail holder 24 of the two-roller link mechanism 11B.

<Minimum Pitch of Link Mechanisms>

The link devices 10R and 10L of this embodiment have the plurality of coupled link mechanisms 11. More specifically, the link devices 10R and 10L have the plurality of three-roller link mechanisms 11A and two-roller link mechanisms 11B. Further, the three-roller link mechanisms 11A and the two-roller link mechanisms 11B are arranged alternately.

Therefore, the minimum pitch between the adjacent link mechanisms 11 is smaller than that in the mode in which all the link mechanisms 11 are the three-roller link mechanisms 11A. Further, the minimum pitch between the adjacent link mechanisms 11 is smaller than that in the mode in which two or more three-roller link mechanisms 11A are continuously arranged.

Further, the two small-diameter guide rollers 31a and 31b provided on the rail holder 24 of the three-roller link mechanism 11A partially overlap with each other in the radial direction. Therefore, the three-roller link mechanism 11A is downsized without reducing the outer diameters of the small-diameter guide rollers 31a and 31b. From another viewpoint, the three-roller link mechanism 11A is downsized while keeping the strength of the small-diameter guide rollers 31a and 31b. Since the three-roller link mechanisms 11A are downsized, the minimum pitch between adjacent link mechanisms 11 is further reduced.

In addition, the adjacent three-roller link mechanism 11A and two-roller link mechanism 11B can be brought close to each other until the guide rollers 30 thereof partially overlap with each other. As a result, the minimum pitch between the adjacent link mechanisms 11 is further reduced.

When a resin film or a resin sheet is stretched, if the intervals (chucking width) for gripping the resin film are narrowed, a resin film having good molecular orientation and isotropy in crystal structure can be obtained. The resin film having good molecular orientation and isotropy in crystal structure is excellent in various properties such as mechanical properties, thermal properties, optical properties, and surface properties.

In this embodiment, the film 8 is stretched while being gripped by the clips 21 provided on the plurality of link mechanisms 11. Therefore, the minimum pitch between the adjacent link mechanisms 11 corresponds to the interval (chucking width) for gripping the film 8. Namely, by using the link devices 10R and 10L of this embodiment in which the minimum pitch between the adjacent link mechanisms 11 is small, various properties of the film 8 including the above properties can be improved.

<Moment Acting on Chucking Portion>

FIG. 11 is an explanatory diagram of a moment acting on a chucking portion of the two-roller link mechanism. FIG. 12 is an explanatory diagram of a moment acting on a chucking portion of the three-roller link mechanism.

The three-roller link mechanism 11A and the two-roller link mechanism 11B grip the film 8 by the clips 21 provided on the rail holders 24. Namely, the clip 21 is a chucking portion for gripping the film 8.

The rail holder 24 on which the clip 21 is provided is rotatably coupled to the base member 26 via the link shaft 40. From another viewpoint, the chucking portion is rotatable with the link axis on the side with the rail 14 as a rotation axis. Also, as described above, a clearance is provided between the rail 14 and the guide roller 30 provided on the rail holder 24.

Therefore, when a clockwise moment M1 acts on the rail holder 24 of the two-roller link mechanism 11B shown in FIG. 11, the rail holder 24 rotates clockwise. Then, the large-diameter guide roller 34b hits the side surface of the rail 14, and a force F that cancels the moment M1 is generated.

Further, when a counterclockwise moment M2 acts on the rail holder 24 of the two-roller link mechanism 11B shown in FIG. 11, the rail holder 24 rotates counterclockwise. Also at this time, the large-diameter guide roller 34b hits the side surface of the rail 14, and a force F that cancels the moment M2 is generated.

When a clockwise moment M1 acts on the rail holder 24 of the three-roller link mechanism 11A shown in FIG. 12, the rail holder 24 rotates clockwise. Then, the small-diameter guide roller 31a hits the side surface of the rail 14, and a force F that cancels the moment M1 is generated.

Further, when a counterclockwise moment M2 acts on the rail holder 24 of the three-roller link mechanism 11A shown in FIG. 12, the rail holder 24 rotates counterclockwise. Then, the small-diameter guide roller 31b hits the side surface of the rail 14, and a force F that cancels the moment M2 is generated.

When a moving distance (D1a) until the large-diameter guide roller 34a hits the rail 14 when the rail holder 24 shown in FIG. 11 rotates clockwise is compared with a moving distance (D2a) until the small-diameter guide roller 31a hits the rail 14 when the rail holder 24 shown in FIG. 12 rotates clockwise, D2a is shorter than D1a (D2a<D1a).

When a moving distance (D1b) until the large-diameter guide roller 34b hits the rail 14 when the rail holder 24 shown in FIG. 11 rotates counterclockwise is compared with a moving distance (D2b) until the small-diameter guide roller 31b hits the rail 14 when the rail holder 24 shown in FIG. 12 rotates counterclockwise, D2b is shorter than D1b (D2b<D1b).

Namely, when the same moment acts on the three-roller link mechanism 11A and the two-roller link mechanism 11B, the amount of movement of the chucking portion of the three-roller link mechanism 11A is smaller than the amount of movement of the chucking portion of the two-roller link mechanism 11B. From another viewpoint, the chucking portion of the three-roller link mechanism 11A is superior in stability to the moment as compared with the chucking portion of the two-roller link mechanism 11B.

If the link devices 10R and 10L are composed of only the two-roller link mechanisms 11B, the minimum pitch between the adjacent link mechanisms 11 can be further reduced. However, when the link devices 10R and 10L are composed of only the two-roller link mechanisms 11B, the stability of the chucking portion with respect to the moment is reduced. If the stability of the chucking portion with respect to the moment is reduced, the film 8 may be twisted or the film 8 may be torn.

Namely, in the link devices 10R and 10L of this embodiment in which the three-roller link mechanisms 11A and the two-roller link mechanisms 11B are alternately arranged, the minimum pitch between the adjacent link mechanisms 11 is narrowed without reducing the stability of the chucking portion with respect to the moment.

In the foregoing, the invention made by the inventors has been concretely described based on the embodiment and example. However, it is needless to say that the present invention is not limited to the above-described embodiment and example and various modifications can be made within the range not departing from the gist of the present invention. For example, the guide roller in each link mechanism may be formed of the outer ring of one rolling bearing, or may be formed of the outer rings of two or more rolling bearings. For example, one guide roller may be formed of the outer rings of two or more rolling bearings stacked in multiple stages. Understandably, the guide roller is not limited to the outer ring of the rolling bearing. Further, the dimensions (outer diameter, thickness, etc.) of the guide roller can be changed as appropriate.

What is claimed is:

1. A link device used in a stretching machine for stretching a film, the link device having a plurality of link mechanisms which are coupled so as to form an endless chain and can move along two rails,
    wherein each of the link mechanisms includes:
        a first rail holder and a second rail holder;
        a base member bridging the first rail holder and the second rail holder;
        a link plate having one end rotatably coupled to the second rail holder and the other end rotatably coupled to the first rail holder of another link mechanism;
        a clip provided on the base member and gripping the film;
        a plurality of guide rollers provided on the first rail holder and moving along one of the two rails while rotating; and
        a plurality of guide rollers provided on the second rail holder and moving along the other of the two rails while rotating,
    wherein the plurality of link mechanisms include three-roller link mechanisms in each of which three guide rollers are provided on the first rail holder and two-roller link mechanisms in each of which two guide rollers are provided on the first rail holder, and
    wherein the three-roller link mechanisms and the two-roller link mechanisms are arranged alternately.

2. The link device according to claim 1,
    wherein two small-diameter guide rollers having the same outer diameter and one large-diameter guide roller having an outer diameter larger than that of the small-diameter guide roller are provided on the first rail holder of the three-roller link mechanism, and
    wherein the small-diameter guide rollers move along one side of the rail and the large-diameter guide roller moves along the other side of the rail.

3. The link device according to claim 2,
    wherein two large-diameter guide rollers having the same outer diameter as that of the large-diameter guide roller are provided on the first rail holder of the two-roller link mechanism, and
    wherein the one large-diameter guide roller moves along one side of the rail and the other one large-diameter guide roller moves along the other side of the rail.

4. The link device according to claim 3,
    wherein the adjacent three-roller link mechanism and two-roller link mechanism can be brought close to each other until one of the two small-diameter guide rollers provided on the three-roller link mechanism and one of the two large-diameter guide rollers provided on the two-roller link mechanism partially overlap with each other.

5. The link device according to claim 4,
    wherein the two small-diameter guide rollers provided on the three-roller link mechanism are arranged at different heights in a direction of a rotation axis and partially overlap with each other in a radial direction.

6. The link device according to claim 5,
wherein the outer diameter of the large-diameter guide roller is 37 mm,
wherein the outer diameter of the small-diameter guide roller is 32 mm, and
wherein a minimum pitch between the adjacent link mechanisms is 40 mm.

7. The link device according to claim 1,
wherein each of the guide rollers on the first rail holder and the second rail holder is an outer ring of a rolling bearing mounted on a shaft.

8. A stretching machine comprising a pair of link devices configured to convey and stretch a film,
wherein each of the link devices has a plurality of link mechanisms which are coupled so as to form an endless chain and can move along two rails,
wherein each of the link mechanisms includes:
a first rail holder and a second rail holder;
a base member bridging the first rail holder and the second rail holder;
a link plate having one end rotatably coupled to the second rail holder and the other end rotatably coupled to the first rail holder of another link mechanism;
a clip provided on the base member and gripping the film;
a plurality of guide rollers provided on the first rail holder and moving along one of the two rails while rotating; and
a plurality of guide rollers provided on the second rail holder and moving along the other of the two rails while rotating,
wherein the plurality of link mechanisms include three-roller link mechanisms in each of which three guide rollers are provided on the first rail holder and two-roller link mechanisms in each of which two guide rollers are provided on the first rail holder, and
wherein the three-roller link mechanisms and the two-roller link mechanisms are arranged alternately.

9. The stretching machine according to claim 8,
wherein two small-diameter guide rollers having the same outer diameter and one large-diameter guide roller having an outer diameter larger than that of the small-diameter guide roller are provided on the first rail holder of the three-roller link mechanism,
wherein the two small-diameter guide rollers of the three-roller link mechanism move along one side of the rail and the one large-diameter guide roller of the three-roller link mechanism moves along the other side of the rail,
wherein two large-diameter guide rollers having the same outer diameter as that of the large-diameter guide roller are provided on the first rail holder of the two-roller link mechanism, and
wherein the one large-diameter guide roller of the two-roller link mechanism moves along one side of the other rail and the other one large-diameter guide roller of the two-roller link mechanism moves along the other side of the other rail.

10. The stretching machine according to claim 9,
wherein the adjacent three-roller link mechanism and two-roller link mechanism can be brought close to each other until one of the two small-diameter guide rollers provided on the three-roller link mechanism and one of the two large-diameter guide rollers provided on the two-roller link mechanism partially overlap with each other.

11. The stretching machine according to claim 10,
wherein the outer diameter of the large-diameter guide roller is 37 mm,
wherein the outer diameter of the small-diameter guide roller is 32 mm, and
wherein a minimum pitch between the adjacent link mechanisms is 40 mm.

* * * * *